United States Patent [19]
Pincha

[11] 3,902,706
[45] Sept. 2, 1975

[54] MECHANICAL HOLDING CHUCK
[76] Inventor: Philip J. Pincha, 5605 Noble Cir. Southeast, Huntsville, Ala. 35802
[22] Filed: Dec. 26, 1973
[21] Appl. No.: 427,908

[52] U.S. Cl. .................. 269/7; 125/35; 269/289
[51] Int. Cl.² ........................................ B23Q 3/00
[58] Field of Search .......... 51/216 R, 216 LP, 277; 125/35; 269/7, 283, 289, 302.1

[56] References Cited
UNITED STATES PATENTS
530,733  12/1894  Tower ............................ 269/283
2,431,282  11/1947  Speed ............................ 125/35

*Primary Examiner*—Roy Lake
*Assistant Examiner*—Mark S. Bicks

[57] ABSTRACT

A mechanical chuck consisting of a retainer clip with a form block having a removeable pallet which in use is securely locked to the retainer and block.

1 Claim, 3 Drawing Figures

PATENTED SEP 2 1975  3,902,706

3,902,706

MECHANICAL HOLDING CHUCK

BACKGROUND OF THE INVENTION

1. Field of Invention

In the sawing, grinding, and polishing of rough stones into smooth objects of art, analytical specimens, or for petrographic analyses, a machine vise and a holding chuck are used to retain and position the rough stone while sawing. A separate holding chuck used in conjunction with the sawing machine vise allows the maximum number of slabbing cuts to be made on the rough stone.

2. Description of Prior Art

Most previous lapidary chucks have limited holding power because of the method of attempting to physically grasp the rough stone's irregular surface with mechanical bars, fingers, or screws, or on magnetically held pallet systems (limited by the magnets holding power). Some other chucking systems utilize a thermoplastic bond of the rough stone to the chuck which creates a holding power limit since no provisions for dissipating heat from the bond face area is provided.

Another problem with prior art lapidary chucks is that a previously mounted and sawn stone cannot be remounted in the chuck and easily permit a new cut to be made parallel to the previously cut flat surface. Most of the prior art lapidary chucks do not allow very thin slabs to be cut nor allow successive cuts of the entire rough stone without leaving a large portion retained by the chuck.

Other problems with prior lapidary chucks include the inability to grasp rough stones larger than the chuck and the inability to change rough stone quickly.

SUMMARY OF THE INVENTION

The present invention consists of a lapidary mechanical chuck having a pallet retaining clip attached to a heat radiating form block and a removeable grooved pallet which may be securely retained by a moveable pallet latch.

DESCRIPTION OF THE PREFERRED EMBODIMENT

Figure 1:
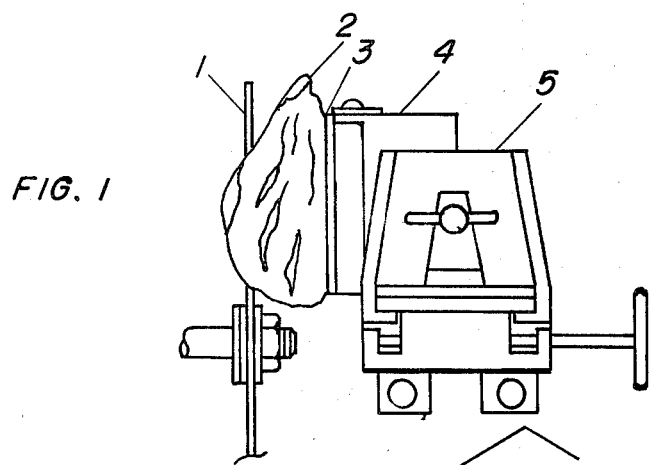
FIG. 1 is a side elevation of the invention shown in place in a cross-feed lapidary saw vise.

Referring now to the drawing in detail wherein like reference characters indicate like parts throughout the several figures the reference numeral 4 indicates generally a Lapidary Mechanical Chuck in accordance with the invention.

Figure 3:
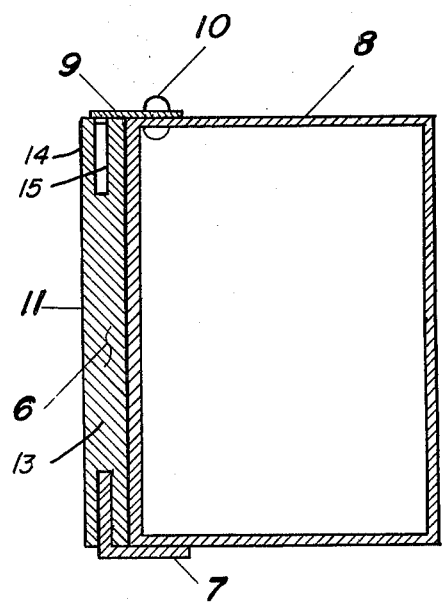
FIG. 3 is an enlarged fragmentary cross-sectional view of the pallet retention.

The Lapidary Mechanical Chuck 4 has a basic regular parallelepiped shape maintained by the form block 8 which is adapted to be supported by a lapidary saw vise 5 which operates in a conventional manner. The major chuck parts are formed of metal to provide a heat flow path and radiating heat sink for the cement bond 3 which joins the removeable pallet 6 to the rough stone 2. The removeable pallet 6 rear portion slides into a recess formed by the pallet retainer 7 and the form block 8 while the pallet retainer 7 slides in the grooves of the pallet 6 as can be best seen in FIG. 3.

The pallet latch 9 is rotated on pivot 10 to securely lock the pallet 6 in place. Thus assembled the pallet cannot be rotated, moved laterally or motioned fore and aft independent of the assembled invention 4.

Figure 2:
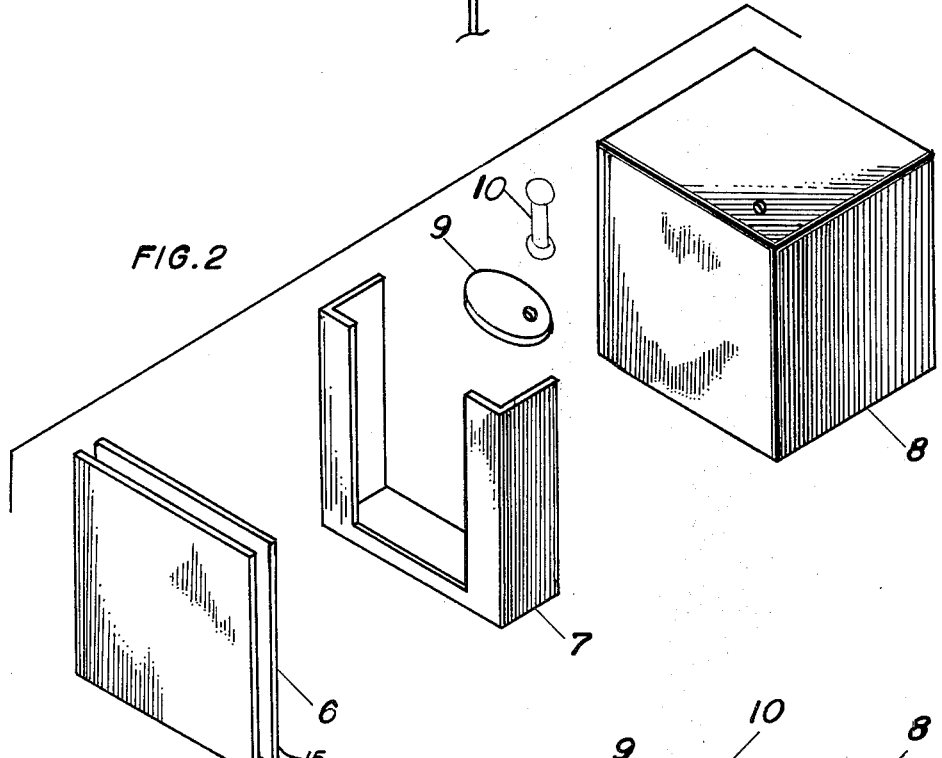
FIG. 2 is an exploded perspective view of the invention.

In normal operation, the Lapidary Mechanical Chuck 4 minus the removeable pallet 6 is placed in a saw vise 5 and positioned using shims if necessary to secure and maintain a parallel position with the saw blade 1. The Lapidary Mechanical Chuck 4 thus secured in the vise 5 then moves in a conventional manner with the vise 5. A rough stone 2 is cemented 3 to the removeable pallet 6 bonding face 11 and the pallet 6 with the stone 2 cemented in place is placed in the Lapidary Mechanical Chuck 4 and secured by the latch 9. Thus assembled as in FIG. 1, the stone 2 can be cut into slices or slabs having parallel faces and successive cuts can be made on the stone 2 right up to the bond line 3. Using additional pallets 6, stones may be mounted for interchanging in the Lapidary Mechanical Chuck 4 as desired to take a cut. As shown in FIGS. 1 and 2, pallet 6 consists of a central support or support region interior of an opposite bonding face 11, designated in the attached amendment of the drawing as a region 13. This support holds these plates 14 and 15, best shown in FIG. 2, but also illustrated in FIG. 3, which shows pallet 6 mounted on pallet retainer 7 which includes a spaced mounting flange region 16 (FIG. 2), particularly illustrated as being spaced from block 8 in FIG. 3. Any stone 2 mounted on a pallet 6 may be removed from the Lapidary Mechanical Chuck 4 and replaced at a later time without loosing parallelism to the blade 1, hence uneven slabs (waste) are eliminated. For photo-projection and petrographic analyses of rocks or stones, a single thin slice of the stone 2 can be made between the blade 1 and the bond line 3 utilizing the back-up strength of the pallet 6 to keep the thin slice from fracturing during sawing. The pallet 6 mounted thin slice can be flat lapped while mounted as required for analyses. The pallet 6 bonding face 11, is not bounded by any of the Lapidary Mechanical Chuck 4 parts hence rough rock 2 larger than the pallet 6 are easily mounted.

Having thus described the preferred embodiment of the invention, it should be understood that numerous structural modifications and adaptations may be resorted to without departing from the spirit of the invention.

I claim:

1. A lapidary mechanical chuck comprising:
   a rectangular block having a pair of opposite sides adapted to be gripped by a vise and a pallet mounting side at right angles to said opposite sides;
   pallet mounting means comprising a spaced mounting flange region supported by said block and having a plate region lying parallel to and spaced from said pallet mounting side, and wherein said spaced mounting flange region comprises a pair of spaced mounting flanges supported by said block and having turned-in plate members lying parallel to and spaced from said pallet mounting side;
   pallet means including a support and spaced plates mounted on opposite sides of said support and dimensioned to slidably fit over said mounting flange region, whereby said pallet means may be mounted and supported on said mounting flange region, and one of said plates provides an exposed surface to which a work piece may be affixed, said pallet mounting means comprising a said support which is a central support, and said spaced plates comprise a pair of spaced plates mounted on opposite sides of said support and dimensioned to slidably fit over said flanges, whereby said pallet means may be mounted and slidably supported on said mounting flanges;

locking means supported by said block, said locking means comprising:

means supported by said block for limiting travel of said pallet means in a first direction; and a locking plate mounted on said block and means for adjustably locking said locking plate over an edge of said pallet means, and means for positioning said locking plate on said block for blocking travel of said pallet means in a direction opposite to said first direction.

* * * * *